(12) United States Patent
Hou

(10) Patent No.: US 11,262,616 B2
(45) Date of Patent: Mar. 1, 2022

(54) BACKLIGHT MODULE AND MANUFACTURING METHOD THEREOF

(71) Applicant: TCL CHINA STAR OPTOELECTRONICS TECHNOLOGY CO., LTD., Shenzhen (CN)

(72) Inventor: Weikang Hou, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/711,553

(22) Filed: Dec. 12, 2019

(65) Prior Publication Data

US 2021/0149250 A1    May 20, 2021

Related U.S. Application Data

(63) Continuation of application No. PCT/CN2019/119832, filed on Nov. 21, 2019.

(30) Foreign Application Priority Data

Nov. 14, 2019 (CN) .......................... 201911110224.7

(51) Int. Cl.
G02F 1/13357 (2006.01)
(52) U.S. Cl.
CPC .............................. G02F 1/133603 (2013.01)
(58) Field of Classification Search
CPC ................................................. G02F 1/133603
See application file for complete search history.

(56) References Cited

U.S. PATENT DOCUMENTS

| | | | |
|---|---|---|---|
| 2004/0027545 A1 | 2/2004 | Yokoyama et al. | |
| 2011/0242453 A1* | 10/2011 | Van De Ven | G02F 1/133603 349/62 |
| 2013/0003355 A1 | 1/2013 | Moriya et al. | |
| 2015/0055054 A1 | 2/2015 | Dunn | |
| 2015/0187999 A1* | 7/2015 | Song | G02B 6/0051 349/64 |

FOREIGN PATENT DOCUMENTS

| | | |
|---|---|---|
| CN | 101587934 A | 11/2009 |
| CN | 102323688 A | 1/2012 |
| CN | 202546687 U | 11/2012 |
| CN | 108873479 A | 11/2018 |
| EP | 0869388 A1 | 10/1998 |

* cited by examiner

*Primary Examiner* — Kevin Quarterman
(74) *Attorney, Agent, or Firm* — Osha Bergman Watanabe & Burton LLP

(57) ABSTRACT

A backlight module and a manufacturing method thereof are disclosed. The backlight module includes a frame, a thin-film thermoelectric device set, a first heat conductive layer, a light emitting diode (LED) light, a bulk thermoelectric device set, and a second heat conductive layer. The manufacturing method for backlight module includes a device preparing step, a thin-film thermoelectric device set mounting step, a first heat conductive layer preparing step, an LED light mounting step, a bulk thermoelectric device set mounting step, and a bulk thermoelectric device set mounting step. The technical effect of the invention is to realize the heat dissipation and the recovery and utilization function of the waste heat.

8 Claims, 2 Drawing Sheets

BACKLIGHT MODULE AND MANUFACTURING METHOD THEREOF

CROSS REFERENCES TO RELATED APPLICATIONS

This application is a continuation of PCT Application No. PCT/CN2019/119832, filed Nov. 21, 2019, which claims priority to Chinese Patent Application No. 201911110224.7, filed Nov. 14, 2019. The entire contents of these applications are incorporated herein by reference.

FIELD OF DISCLOSURE

The present disclosure is related to the field of displays, and in particular to a backlight module and a manufacturing method thereof.

BACKGROUND OF DISCLOSURE

Currently, liquid crystal display (LCD) devices are widely used, and a backlight module is one of important components of the LCD devices. The backlight module directly influences a color performance of a display apparatus. Generally, light-emitting diode (LED) lights are used as a backlight of the backlight module. For direct light backlight modules, the LED lights generate considerable heat during a long working process, and high temperatures seriously affect a performance and service life of the LED lights. White LEDs reduce luminous efficiency at high temperatures and even cause a color deviation. For quantum dot light emitting diodes (QLED), quantum dots may be quenched at high temperatures. Additionally, the high temperature of the backlight module affects deflections of liquid crystals and leads to an abnormal or light leakage phenomenon. At present, there is no efficient heat dissipation scheme for the backlight module.

Thermoelectric devices are functional devices that can realize mutual conversion between electric energy and thermal energy. The thermoelectric devices realize temperature difference power generation and electric refrigeration based on the Seebeck effect and the Peltier effect of materials respectively. There is no complicated mechanical transmission structure for the thermoelectric devices, so a refrigerant required by traditional refrigeration devices is not needed. Moreover, the devices have fast response times, quiet and noiseless working processes, accurate temperature control, environment-friendly properties, and a long service life spans. Currently, bulk thermoelectric devices are used commercially, and the great progress has been made in developing high-performance miniaturized flexible thin film thermoelectric devices prepared based on printing or deposition methods. It is highly promising to be an efficient heat dissipation scheme for the backlight module by combining the bulk thermoelectric devices and thin film thermoelectric devices.

SUMMARY OF INVENTION

Technical Problems

The purpose of the present disclosure is to solve the technical problem of low heat dissipation efficiency of a backlight module existing in the prior art.

Technical Solutions

In order to achieve the above purpose, a backlight module is provided. The backlight module includes: a frame; a thin-film thermoelectric device set disposed on a surface of a side of the frame; a first heat conductive layer disposed on a surface of the thin-film thermoelectric device set away from a side of the frame; a light emitting diode (LED) light disposed on a surface of the first heat conductive layer away from a side of the thin-film thermoelectric device set; a bulk thermoelectric device set disposed on the frame and connected to the thin-film thermoelectric device set; and a second heat conductive layer disposed between the bulk thermoelectric device set and the frame.

Further, the thin-film thermoelectric device set includes two sets of thin-film thermoelectric devices disposed opposite to each other; each of the thin-film thermoelectric devices includes at least two thermoelectric legs, and one of the thermoelectric legs connected in parallel to another of the thermoelectric legs.

Further, each of the film thermoelectric devices is attached to the frame; directions of current flows of the two sets of thin-film thermoelectric devices are opposite.

Further, at least two of the LED lights are disposed on the thermoelectric leg, and are connected to the thermoelectric leg by the first heat conductive layer.

Further, a hot side of the thin-film thermoelectric device set is disposed at an edge of the frame, and a cold side of the thin-film thermoelectric device set is disposed on a center of the frame.

Further, the bulk thermoelectric device set includes two sets of bulk thermoelectric devices; each of the bulk thermoelectric devices includes: a first thermoelectric leg; a second thermoelectric leg paralleled to the first thermoelectric leg; and an electrode, one end thereof connected to the first thermoelectric leg and the other end thereof connected to the second thermoelectric leg.

Further, an end of the first thermoelectric leg away from the electrode is electrically connected to the thin-film thermoelectric device set; an end of the second thermoelectric leg away from the electrode is electrically connected to the thin-film thermoelectric device set.

Further, each of the bulk thermoelectric devices further includes an energy storage device connected to a surface of the electrode away from a side of the first thermoelectric leg and the second thermoelectric leg.

In order to achieve the above purpose, a manufacturing method for backlight module is provided. The manufacturing method for backlight module includes: a device preparing step for preparing a frame, a thin-film thermoelectric device set, a heat conductive material, an LED light, a bulk thermoelectric device set and energy storage device; a thin-film thermoelectric device set mounting step for mounting two sets of thin-film thermoelectric devices on the frame to form a thin-film thermoelectric device set; a first heat conductive layer preparing step for coating the heat conductive material on an upper surface of the thin-film thermoelectric device set to form a first heat conductive layer; an LED light mounting step for mounting the LED light on the first heat conductive layer; a second heat conductive layer preparing step for coating the heat conductive material at an edge of the frame to form a second heat conductive layer; a bulk thermoelectric device set mounting step for mounting two sets of the bulk thermoelectric devices on the second heat conductive layer to form the bulk thermoelectric device set, wherein the bulk thermoelectric device set is connected to the second heat conductive layer; and an energy storage device mounting step for mounting the energy storage device outside the thermoelectric device set.

Further, in the preparing process, a thermoelectric material powder is sintered to form a bulk material, and the bulk thermoelectric device set is formed after being assembled by a packaging process; a thermoelectric material is prepared on a flexible substrate by a method of vacuum evaporation or magnetron sputtering or screen printing and the thin-film thermoelectric device set is formed after the packaging process and assembly.

Beneficial Effects

Technical effects of the present disclosure are to combine the thin-film thermoelectric device set and the bulk thermoelectric device set, so that the heat is transferred to the bulk thermoelectric device set on both sides of the frame through the thin film thermoelectric device set, a heat dissipation function is achieved, and the heat dissipation efficiency is improved. The energy storage device is included in the bulk thermoelectric device set and energy stored in the energy storage device may be used for the backlight module to realize the recycling and reutilization of residual heat.

Figure 1:
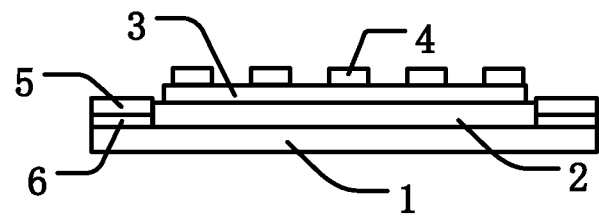
FIG. 1 is a sectional view of a backlight module according to an embodiment of the present disclosure.
Figure 2:
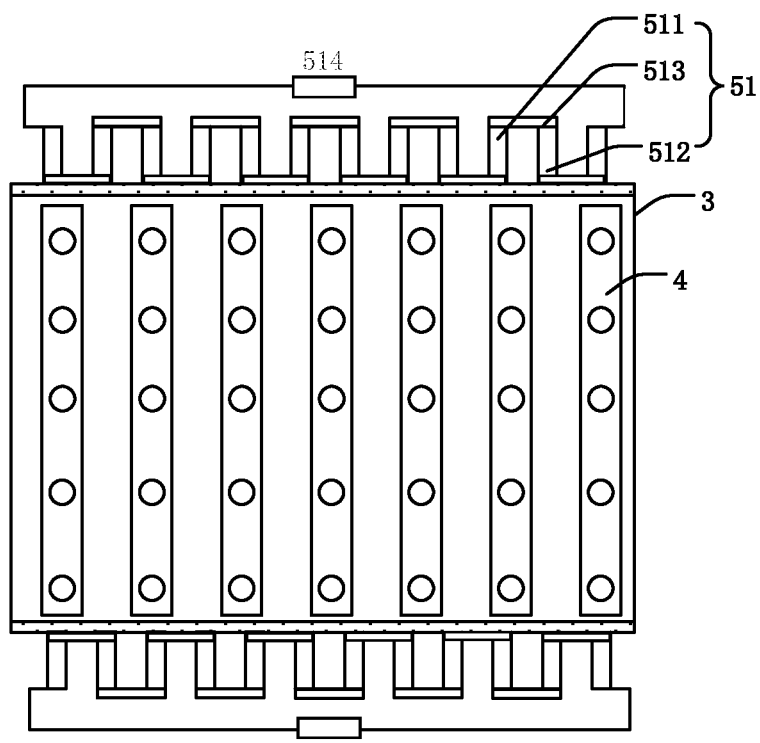
FIG. 2 is a schematic view of a structure of a backlight module according to an embodiment of the present disclosure.

Part of the components are identified as below:

1. frame; 2. thin-film thermoelectric device set; 3. first heat conductive layer; 4. LED light; 5. bulk thermoelectric device set; 6. second heat conductive layer;

21. thin-film thermoelectric device; 211. thermoelectric leg; 212. electrode;

51. bulk thermoelectric device; 511. first thermoelectric leg; 512. second thermoelectric leg; 513. Electrode; 514. energy storage device.

DETAILED DESCRIPTION OF EMBODIMENTS

In order to completely introduce the technical content of the present disclosure to the person skilled in the art and prove the present disclosure may be implemented by examples, the preferred embodiments of the present disclosure are described in detail below with reference to the accompanying drawings and make the technical content of the present disclosure more clearly. The person skilled in the art easily understands how to implement the present disclosure by the preferred embodiments. However, the present disclosure may be implemented in many different forms of embodiments, and the scope of the invention is not limited to the embodiments described herein.

The directional terms mentioned in this disclosure, such as [upper], [lower], [front], [post], [left], [right], [inside], [outside], [side], etc., are only refers to the direction of the additional drawings. Therefore, the terms are used to illustrate and understand the present disclosure, not to limit the present invention.

In additional drawings, the components with the same structures are indicated by the same number label, and the components with similar structure or function are indicated by the similar number label. In addition, for convenience of realization and description, a size and thickness of each of the components shown in the drawings are arbitrarily shown, and the present disclosure does not limit the size and thickness of each of the components.

When some components are described as "on" other components, the components may be directly disposed on other components; or there exists an intermediate component where the components disposed on and the intermediate component disposed on other components. When a component is described as "mounted to" or "connected to" another component, both of them may be understood as directly "mounted" or "connected", or a component is "mounted to" or "connected to" another component by an intermediate component.

Refer to FIG. 1, a backlight module is provided in the present embodiment. The backlight module includes a frame 1, a thin-film thermoelectric device set 2, a first heat conductive layer 3, a light emitting diode (LED) light 4, a bulk thermoelectric device set 5 and a second heat conductive layer 6.

A material of the frame 1 is an aluminum plate, which functions as a support.

The thin-film thermoelectric device set 2 is evenly attached to an upper surface of the frame 1. The thin-film thermoelectric device set 2 includes two sets of thin-film thermoelectric devices 21 and directions of current flows of the two sets of thin-film thermoelectric devices 21 are opposite. That is, a direction of the current flow of one set of the thin-film thermoelectric device 21 is clockwise, and a direction of the current flow of the other set of the thin-film thermoelectric device 21 is counterclockwise. A hot end of each of the thin-film thermoelectric devices 21 is disposed at an edge of the frame 1, and a cold end of each of the thin-film thermoelectric devices is disposed on a center of the frame 1.

Each of the thin-film thermoelectric devices 21 includes thermoelectric legs 211 and electrodes 212 and the thermoelectric legs 211 are strip-shaped. Each of the thermoelectric legs 211 is connected in parallel to another thermoelectric leg 211 through the electrodes 212. The thermoelectric legs 211 may be divided into a P-type thermoelectric leg and an N-type thermoelectric leg and numbers of the thermoelectric legs 211 may be determined according to the size of the frame 1.

The working principle of the thin-film thermoelectric device set 2 is as below: when there is a temperature difference between two ends of the thin film thermoelectric device, due to the Seebeck effect, also known as the first thermoelectric effect, carriers (electrons) in a n-type thermoelectric leg material and carriers (holes) in a p-type thermoelectric leg material in the device are directionally migrated from a high temperature end to a low temperature end, and a directional current is formed in a loop. This is the most basic principle of thermoelectric power generation. When a current is applied to the thermoelectric device, due to a Peltier effect, the carriers (electrons) in the n-type thermoelectric leg material and the carriers (holes) in the p-type thermoelectric leg material are not only respectively directionally migrated from lower ends to upper ends of the two types of the thermoelectric legs under an effect of an external electric field, but also carried a heat at the lower end and transferred the heat to the upper end of the device. This is the most basic principle of thermoelectric refrigeration.

Thin-film thermoelectric devices are functional devices that can realize mutual conversion between electric energy and thermal energy. The thin-film thermoelectric devices realize temperature difference power generation and electric refrigeration based on the Seebeck effect and the Peltier effect of the material respectively. There is no complicated mechanical transmission structure for the thin-film thermoelectric devices, so a refrigerant required by traditional refrigeration devices is not needed. Moreover, the devices have fast response times, quiet and noiseless working processes, accurate temperature control, environment-friendly properties, and a long service life spans.

The first heat conductive layer 3 is disposed on an upper surface of the thin-film thermoelectric device set 2. The first heat conductive layer 3 is made of a thermally conductive silicone grease with high thermal conductivity, the purpose of which is to transfer a heat generated when the LED light 4 in operation to the thin-film thermoelectric device set 2.

At least two of the LED lights 4 are disposed on an upper surface of the first heat conductive layer 3 and disposed opposite the thermoelectric legs 211. When the LED lights 4 are turned on, the LED lights illuminate and generate heat. Through the thin-film thermoelectric device set 2, the heat is transferred from the center to the two ends of the thermoelectric legs 211. A temperature of two edges of the frame 1 is higher than a temperature of the center of the frame 1, and the heat is concentrated at the two sides of the frame 1 of the backlight, so as to realize a heat dissipation effect of the backlight module.

The bulk thermoelectric device set 5 is disposed at the edges of the frame 1 and connected to a hot end of the thin-film thermoelectric device set 2, so as to facilitate recycling and reusing residue heat. The bulk thermoelectric device set 5 includes two sets of the bulk thermoelectric devices 51. Each of the bulk thermoelectric devices 51 is disposed outside the hot end of each of the thin-film thermoelectric devices 21. The LED lights 4 illuminate, and the heat generated by the LED lights 4 are not only transferred from the center to the two ends of the thermoelectric legs 211 through the thin-film thermoelectric device set 2, but also concentrated in the bulk thermoelectric device set 5.

The bulk thermoelectric device 51 includes: a first thermoelectric leg 511, a second thermoelectric leg 512, an electrode 513, and an energy storage device 514. The first thermoelectric leg 511 is the p-type thermoelectric leg and the second thermoelectric leg 512 is the n-type thermoelectric leg. The first thermoelectric leg 511 is electrically connected to the second thermoelectric leg 512 through the electrode 513. One end of the electrode 513 is connected to the first thermoelectric leg 511 and the other end thereof is connected to the second thermoelectric leg 512. An end of the first thermoelectric leg 511 away from the electrode 513 is electrically connected to the thin-film thermoelectric device set 2 and an end of the second thermoelectric leg 512 away from the electrode 513 is electrically connected to the thin-film thermoelectric device set 2. The energy storage device 514 is connected to a side of the electrode 513 away from the first thermoelectric leg 511 and the second thermoelectric leg 512.

Figure 3:
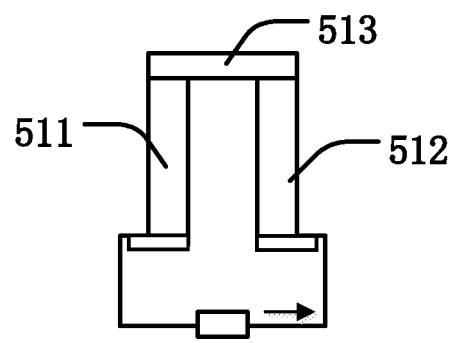
FIG. 3 is a working principle view of a bulk thermoelectric device set according to an embodiment of the present disclosure.

Refer to FIG. 3, the working principle of the bulk thermoelectric device set 5 is as below: when there is the temperature difference between two ends of the bulk thermoelectric device, due to the Seebeck effect, also known as the first thermoelectric effect, carriers (holes) in the first thermoelectric leg 511 (p-type thermoelectric leg) material and carriers (electrons) in the second thermoelectric leg 512 (n-type thermoelectric leg) material in the device are directionally migrated from a high temperature end to a low temperature end, and a directional current is formed in a loop. This is the most basic principle of thermoelectric power generation. When a current in a direction shown as an arrow in FIG. 3 is applied to the thermoelectric device, due to the Peltier effect, the carriers (electrons) in the n-type thermoelectric leg material and the carriers (holes) in the p-type thermoelectric leg material are not only respectively directionally migrated from lower ends to upper ends of the two types of the thermoelectric legs under an effect of an external electric field, but also carried the heat at the lower end and transferred the heat to the upper end of the device. This is the most basic principle of thermoelectric refrigeration.

Because the heat of both sides of the backlight module is higher than an ambient heat, there is a temperature difference between two ends of the bulk thermoelectric device 5, and the bulk thermoelectric device 5 generates current due to the Seebeck effect. The generated current is stored by the energy storage device 514, and the energy may be used for driving circuits or backlight modules to realize the function of residue heat recycling and reutilization.

The bulk thermoelectric devices are functional devices that can realize mutual conversion between electric energy and thermal energy. The bulk thermoelectric devices realize temperature difference power generation and electric refrigeration based on the Seebeck effect and the Peltier effect of materials respectively. There is no complicated mechanical transmission structure for the bulk thermoelectric devices, so a refrigerant required by traditional refrigeration devices is not needed. Moreover, the devices have fast response times, quiet and noiseless working processes, accurate temperature control, environment-friendly properties, and a long service life spans.

The second heat conductive layer 6 is disposed between the frame 1 and the bulk thermoelectric device set 5. The second heat conductive layer 6 is made of the thermally conductive silicone grease with high thermal conductivity and the purpose of which is to transfer the heat.

The technical effects of the present embodiment are to combine the thin-film thermoelectric device set and the bulk thermoelectric device set, so that the heat is transferred to the bulk thermoelectric device set on both sides of the frame through the thin film thermoelectric device set, a heat dissipation function is achieved and the heat dissipation efficiency is improved. The energy storage device is included in the bulk thermoelectric device set and energy stored in the energy storage device may be used for the backlight module to realize the recycling and reutilization of residual heat.

Figure 4:
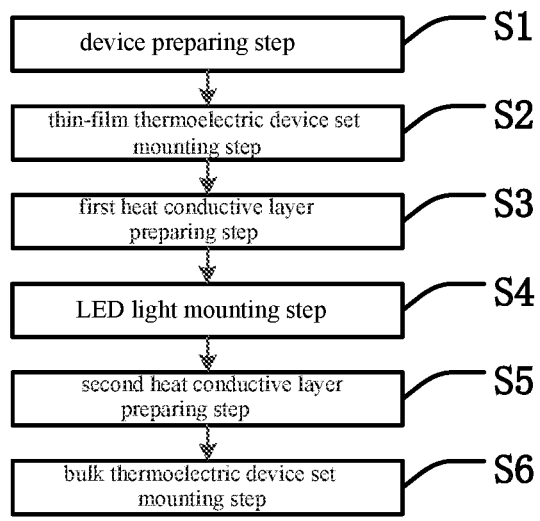
FIG. 4 is a flow chart of a manufacturing method for a blacklight module according to an embodiment of the present disclosure.

Refer to FIG. 4. A manufacturing method for backlight module is provided in the present embodiment. The manufacturing method for backlight module includes steps S1-S6.

Step S1 is a device preparing step for preparing a frame, a thin-film thermoelectric device set, a heat conductive material, an LED light, a bulk thermoelectric device set and an energy storage device. A thermoelectric material powder is formed into a bulk material by hot pressed sintering or spark plasma sintering, and the bulk material is assembled by a packaging process, such as cutting or electrode welding to form a bulk thermoelectric device. The thermoelectric material is prepared on a flexible substrate through vacuum evaporation, magnetron sputtering, or screen printing, and the thin-film thermoelectric device set is formed after the assembly by the electrode connection and packaging process.

Figure 5:
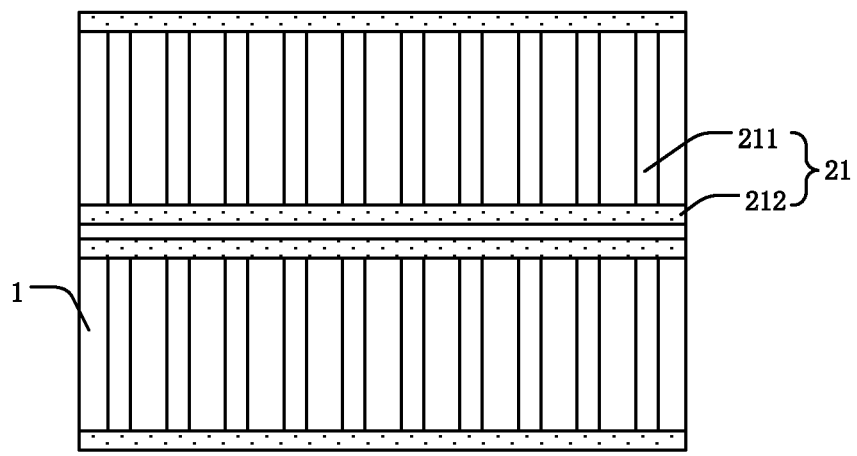
FIG. 5 is a schematic view of a thin-film thermoelectric device set after a thin-film thermoelectric device set mounting process according to an embodiment of the present disclosure.

Step S2 is a thin-film thermoelectric device set mounting step for mounting two sets of thin-film thermoelectric devices 21 on the frame 1 to form a thin-film thermoelectric device set (see FIG. 5).

Step S3 is a first heat conductive layer preparing step for coating the heat conductive material on an upper surface of the thin-film thermoelectric device set to form a first heat conductive layer. The heat conductive material is thermally conductive silicone grease with high thermal conductivity for transferring heat.

Figure 6:
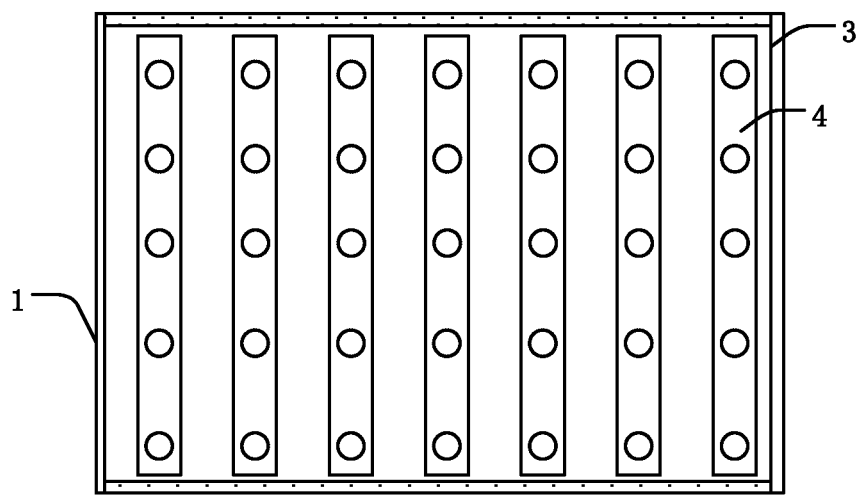
FIG. 6 is a schematic view of a light emitting diode (LED) light after a LED light mounting process according to an embodiment of the present disclosure.

Step S4 is an LED light mounting step for mounting the LED light 4 on the first heat conductive layer 3 (see FIG. 6).

Step S5 is a second heat conductive layer preparing step for coating the heat conductive material at an edge of the frame to form a second heat conductive layer. The heat conductive material is thermally conductive silicone grease with high thermal conductivity for transferring heat.

Step S6 is a bulk thermoelectric device set mounting step for mounting two sets of the bulk thermoelectric devices on the second heat conductive layer to form the bulk thermoelectric device set, wherein the bulk thermoelectric device set is connected to second heat conductive layer.

The technical effects of the present embodiment are to combine the thin-film thermoelectric device set and the bulk thermoelectric device set, so that the heat is transferred to the bulk thermoelectric device set on both sides of the frame through the thin film thermoelectric device set, a heat dissipation function is achieved and the heat dissipation efficiency is improved. The energy storage device is included in the bulk thermoelectric device set and energy stored in the energy storage device may be used for the backlight module to realize the recycling and reutilization of residual heat.

The above description is only the preferred embodiment of the invention. It should be understood by those skilled in the art that they can still modify or improve the above embodiments without departing from the principle of the present disclosure, and these modifications or improvements shall also be regarded as the protection scope of the present invention.

What is claimed is:

1. A backlight module, comprising:
a frame;
a thin-film thermoelectric device set disposed on a surface of a side of the frame;
a first heat conductive layer disposed on a surface of the thin-film thermoelectric device set away from a side of the frame;
a light emitting diode (LED) light disposed on a surface of the first heat conductive layer away from a side of the thin-film thermoelectric device set;
a bulk thermoelectric device set disposed on the frame and connected to the thin-film thermoelectric device set; and
a second heat conductive layer disposed between the bulk thermoelectric device set and the frame.

2. The backlight module as claimed in claim 1, wherein the thin-film thermoelectric device set comprises two sets of thin-film thermoelectric devices disposed opposite to each other;
each of the thin-film thermoelectric devices comprises at least two thermoelectric legs, and one of the thermoelectric legs connected in parallel to another of the thermoelectric leg.

3. The backlight module as claimed in claim 2, wherein each of the film thermoelectric devices is attached to the frame;
directions of current flows of the two sets of thin-film thermoelectric devices are opposite.

4. The backlight module as claimed in claim 2, wherein at least two of the LED lights are disposed on the thermoelectric leg, and are electrically connected to the thermoelectric leg by the first heat conductive layer.

5. The backlight module as claimed in claim 1, wherein a hot end of the thin-film thermoelectric device set is disposed at an edge of the frame, and a cold end of the thin-film thermoelectric device set is disposed on a center of the frame.

6. The backlight module as claimed in claim 1, wherein the bulk thermoelectric device set comprises two sets of bulk thermoelectric devices;
each of the bulk thermoelectric devices comprises:
a first thermoelectric leg;
a second thermoelectric leg paralleled to the first thermoelectric leg; and
an electrode, one end thereof connected to the first thermoelectric leg and the other end thereof connected to the second thermoelectric leg.

7. The backlight module as claimed in claim 6, wherein an end of the first thermoelectric leg away from the electrode is electrically connected to the thin-film thermoelectric device set;
an end of the second thermoelectric leg away from the electrode is electrically connected to the thin-film thermoelectric device set.

8. The backlight module as claimed in claim 6, wherein each of the bulk thermoelectric devices further comprises an energy storage device connected to a surface of the electrode away from a side of the first thermoelectric leg and the second thermoelectric leg.

* * * * *